L. R. GINDRAT.
CIGAR FILLER CUTTER AND CHARGING MECHANISM.
APPLICATION FILED JULY 7, 1915. RENEWED AUG. 20, 1918.

1,281,343.

Patented Oct. 15, 1918.

L. R. GINDRAT.
CIGAR FILLER CUTTER AND CHARGING MECHANISM.
APPLICATION FILED JULY 7, 1915. RENEWED AUG. 20, 1918.

1,281,343.

Patented Oct. 15, 1918.
10 SHEETS—SHEET 10.

Inventor
L. R. Gindrat
By Watson & Boyden
Attorneys

UNITED STATES PATENT OFFICE.

LOUIS R. GINDRAT, OF BALTIMORE, MARYLAND, ASSIGNOR TO THE CIGAR MACHINE CORPORATION OF AMERICA, OF BALTIMORE, MARYLAND, A CORPORATION OF DELAWARE.

CIGAR-FILLER CUTTER AND CHARGING MECHANISM.

1,281,343. Specification of Letters Patent. Patented Oct. 15, 1918.

Application filed July 7, 1915, Serial No. 38,435. Renewed August 20, 1918. Serial No. 250,751.

*To all whom it may concern:*

Be it known that I, LOUIS R. GINDRAT, a citizen of the United States, residing at Baltimore, in the State of Maryland, have invented certain new and useful Improvements in Cigar-Filler Cutter and Charging Mechanisms, of which the following is a specification.

This invention relates to a machine for cutting and storing tobacco filler preparatory to delivering the same to automatic feed mechanism of cigar bunching machines, such as shown in my companion application Serial No. 52,623, filed September 25, 1915.

In manufacturing cigar bunches by machinery, the filler is usually cut to the desired length on a filler cutting machine and placed in receptacles, such as cans or boxes, from whence it is removed by hand and fed to the bunching machine. When the filler is laid in the receptacles, after being cut, it becomes more or less disarranged, and in removing the filler to place it manually in the bunching machine, a further disarrangement takes place, and more or less of the tobacco is broken or crumpled in rearranging it and feeding it to the bunching machine, the breakage being greater where the tobacco becomes dry by exposure to the atmosphere, after a considerable period of time in the open receptacles.

In addition to the loss of tobacco resulting from this method of handling the filler, there is an attendant loss in time and labor of even greater importance, all of which are avoided by the use of my invention. Ordinarily, the filler is cut and placed in a suitable portable receptacle by one operator; another operator removes the filler by hand from the receptacle and arranges it upon the feeding devices of a bunching machine, and a third operator at the delivery end of the bunching machine, places the binders in position to be rolled around the filler, by the machine, to form the complete bunches. If either operator on the bunching machine is absent temporarily, the machine must be stopped, as both are required to operate it, and evidently, when both are present, one slow operator may delay the work of the machine and of the other operator.

In order to overcome the losses in time, labor, and material above mentioned, as well as to make more uniform cigar bunches, I have provided two complementary mechanisms, one, shown in the drawings of the present application, for cutting the filler to proper lengths and for storing it in a spiral layer between belts or webs on a charging reel, which is detachable from the machine, and the other, illustrated in my companion application, Serial No. 52,623, adapted to receive the charged reel and automatically unwind the webs and feed the filler directly therefrom to the cigar bunching mechanism.

In operating the machine illustrated in the present application, the operator holds a bundle of tobacco leaves in both hands, one hand at each side of the cutting blade, and the blade descends, cutting off a bundle of filler which remains grasped in the operator's hand, and which is then laid by the operator directly upon one of the webs connected to the charging reel, and this operation is repeated, the successive bundles of filler being laid in a layer on the web, and the latter being fed toward the reel, intermittently, at each operation of the cutter. Another web connected to the reel is laid upon the layer of filler as it progresses toward the reel, and holds the filler in the position in which it was laid by the operator on the first mentioned web. Thus, a continuous layer of filler becomes wound on to the reel, between the webs. The webs are long enough to hold sufficient filler for making a large number of cigar bunches, and when the webs have been entirely wound upon the reel, the latter is removed from the charging machine and placed upon a bunching machine, where the webs are automatically unwound from the reel and the filler is delivered to the bunching mechanism and made into bunches.

One cutting and charging machine may be used to charge reels for several bunching machines, or, if it is not desired to make the filler into bunches immediately, the charged reel or reels may be placed in a humidor to keep the filler moist until used for making bunches. As the filler, when on the reel, is protected to a large extent from the drying effect of the atmosphere, it will keep its moisture for a considerable period of time, even if not placed in a humidor, and when fed into the bunching machine there will be less breakage and destruction of the tobacco than where the filler is stored in open vessels and fed into the machine by hand.

By the use of these mechanisms, rehandling of the filler, after it has been cut, is entirely avoided, with a consequent saving in material and labor, and the production of more uniform bunches, and a further saving in labor is effected by reason of the fact that only one person is required to operate the bunching machine, the services of the operator at the feed end of the machine being dispensed with.

In the accompanying drawing, which illustrates the filler, cutting and charging machine.

Fig. 6ª is a detail view, further illustrating the operation of the reel tensioning devices;

Fig. 7ª is a section on the line 7ª—7ª of Fig. 7;

Referring to the drawing, A indicates the frame of the machine comprising a flat table or bed 1 supported at its ends by standards 2 and 3 which are tied together by suitable cross rods 4. The central portion of the machine is occupied by the detachable charging reel C and web-holding spools B and B' the webs b and b' and the guide rolls and feed rolls for the webs. The driving and cutting mechanisms are arranged at the right side of the machine and the mechanisms for operating the charging reel and applying tension to the webs as well as for regulating the feed of the webs are located at the left side of the machine. In hangers 5 depending from the bed of the machine is journaled a driving shaft 6 having thereon a gear 7 which meshes with a pinion 8 on an electric motor 9, suspended from the bed 1. The shaft 6 carries a sprocket wheel 10, which is connected by a sprocket chain 11 to a sprocket wheel 12, on a counter-shaft 13, journaled in standards 14 upon the top of the bed plate. This counter-shaft carries a small fly wheel 15, and a pinion 16, secured to the shaft, meshes with a gear 17, journaled upon a clutch shaft 18, which latter is journaled in bearings 19 and 20. Upon the clutch shaft is arranged a one-revolution clutch k, (Figs. 3 and 4) one member, 21, of which is secured to the gear 17, while the other member 22 of the clutch is splined to the shaft 18. The latter member is normally stationary and is manually tripped into engagement with the member 21, when desired, by means of a pedal 23, connected by a rod 24 to a clutch lever 25. Any suitable form of one-revolution clutch may be employed, the one illustrated in the drawing being like that shown and described in my co-pending application Serial No. 22,876, filed April 21, 1915. When the motor is in operation the shafts 6 and 13 and the clutch gear 17 are constantly driven, and it will be seen that when the pedal 23 is operated, the clutch member 22 will be tripped into engagement with the clutch member 21, and at the completion of one revolution of the shaft 18, the clutch members will be automatically dis-engaged.

Figure 3:
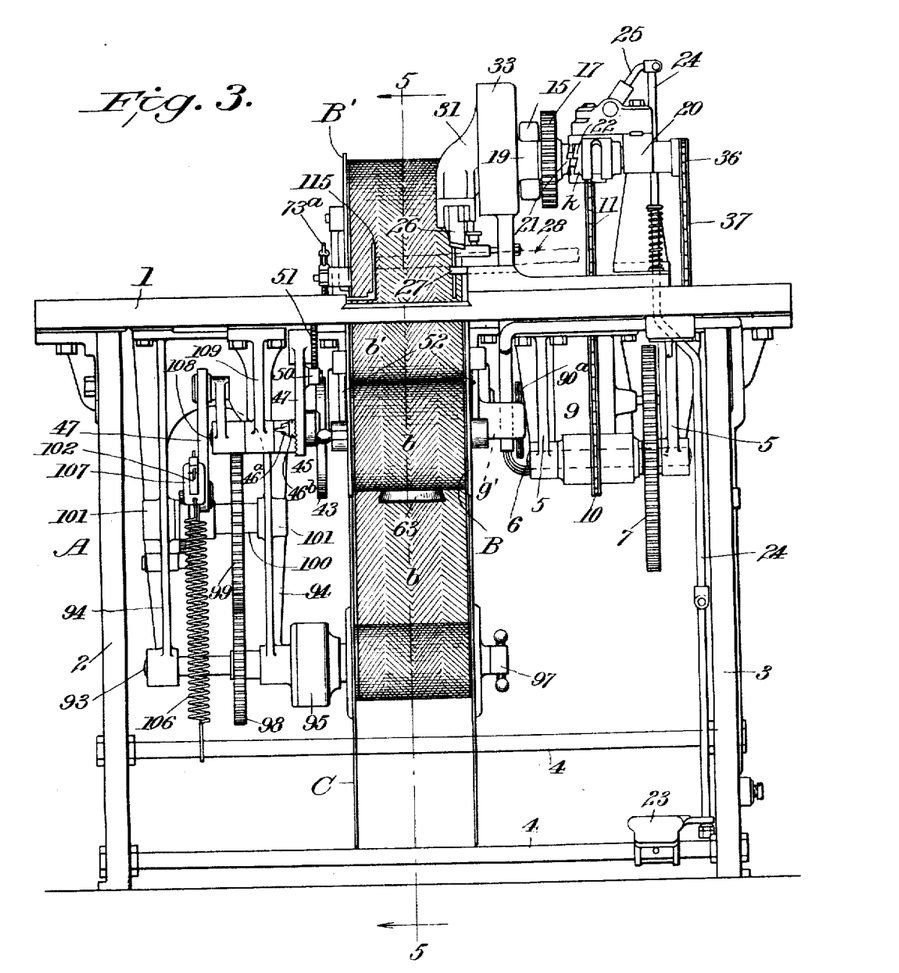
Fig. 3 is a front elevation of the same.
Figure 4:
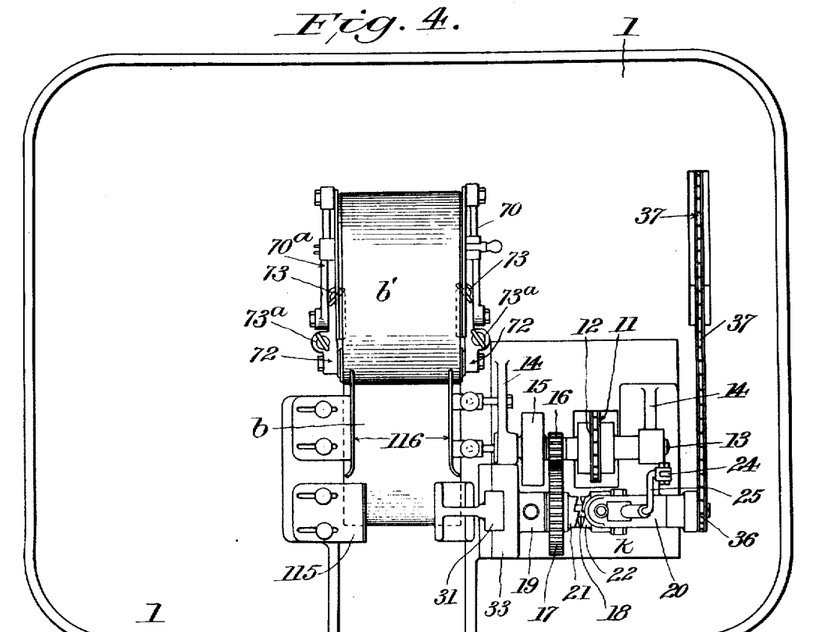
Fig. 4 is a plan view of the same.
Figure 17:
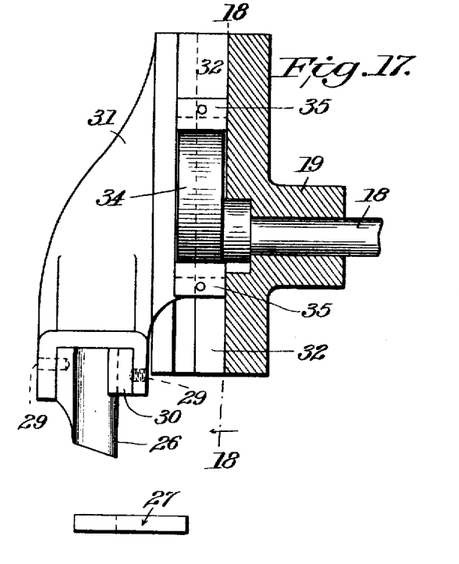
Fig. 17 is a front view of the knife head, and knives, the guide for the head being shown in central section, and the operating shaft and cam being also shown.
Figure 18:
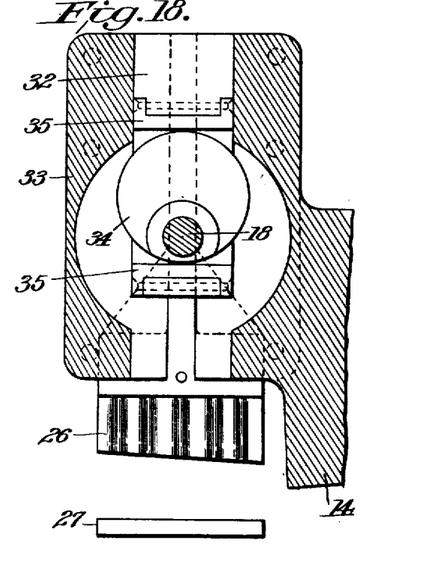
Fig. 18 is a section on the line 18—18 of Fig. 17.
Figures 19, 20, 21:
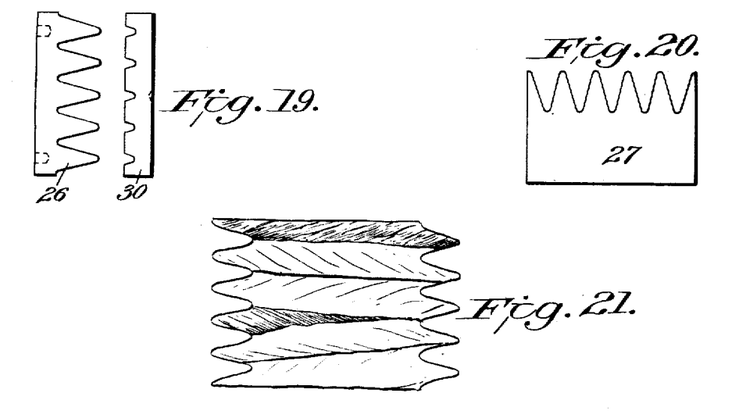
Fig. 19 is a bottom plan view of the movable knife and a similar view of the key for securing the knife in the head.
Fig. 20 is a plan view of the stationary knife.
Fig. 21 is a view showing tobacco leaves cut by the knives.

At each operation of the shaft 18, a reciprocating knife or cutter 26 (Figs. 17 and 18) is moved downward and upward, and coöperates with a stationary cutter 27 to cut the filler, which is held by the operator between the knives, in the position indicated by dotted outlines 28, in Fig. 3. The movable knife or cutter 26 is secured by set screws 29 and a key 30 to a head 31, which slides in guideways 32 in a guide block 33. The bearing 19, for the clutch shaft 18, is integral with this guide block and the shaft has upon it an eccentric 34, which fits between cross-pieces 35 on the knife head and operates said head and the knife when the shaft is rotated. The blades of the cutter are serrated as shown in Figs. 19 and 20, so that when the filler is cut its ends will also be serrated, as illustrated in Fig. 21, to provide for tapering the ends of the bunch when the cigar is formed.

As the filler must all be cut to the proper length before it is delivered to the belts or webs, the feeding of the webs is timed to the operation of the cutter, and hence the mechanism for controlling the feed of the webs, which will now be described, is driven from the clutch shaft which operates the cutter. The clutch shaft 18 has secured to it a driving sprocket wheel 36, which is connected by a chain 37 to a sprocket wheel 38, which latter is secured to a shaft 39, mounted in hangers 40 at the rear of the machine. This shaft is provided with a brake wheel 41, surrounding which is a spring brake band 42, adapted to apply sufficient braking force to the shaft to stop its rotation substantially at the point in its revolution when the clutch $k$ is released. Also secured to said shaft 39, at its left hand end, is a crank disk 43 having several perforations 43$^a$ at different radial distances from the center of the shaft, and a crank pin 44, upon end of a connecting rod 45, is adapted to be fitted into any of the several perforations to vary the throw of the rod. The other end of the connecting rod is pivoted upon a crank pin 46, which is adjustably mounted upon a lever 47, the latter journaled upon a shaft 48, which supports the feed roller 49. The shaft 48 is journaled in two similar parallel bearing plates 52, suspended from the bed plate 1, these plates being shown in Fig. 7 and 7$^a$ on an enlarged scale. As shown, the lever 47 has a longitudinal slot 47$^a$, through which the pin 46 extends, and the pin is held in any desired position of adjustment by means of a clamping nut 46$^a$ and a serrated washer 46$^b$, which latter engages serrations in the side of the lever 47. A spring pressed feed pawl 50, mounted on one edge of the lever 47, engages a ratchet wheel 51 secured to the shaft 48, and a holding pawl 53, pivoted to one of the plates 52, engages the ratchet wheel 51 and prevents backward rotation of the same. It will be understood that with this construction, at each revolution of the crank disk 43, the lever 47 will be moved forward and back and the pawl thereon will cause the feed shaft 48 and feed roller to be given a movement of definite degree in the direction of the arrow, Fig. 2. The length of this movement may be varied by adjusting the position of the pin 46 with relation to the lever 47, or by setting the pin 44 in a different opening in the disk 43. The brackets or side plates 52 are provided with bearings 54 for a rock shaft 55, and with annular recesses 56 on their adjacent faces, concentric with the axis of said shaft. Slots or grooves 57 are also formed on the inner faces of the side plates, extending from the annular recesses 56, in line with the axis of the shaft 55 and the axis of the feed roller 49. Within the annular recesses 56, and secured to the shaft 55, are eccentrics 58, and within the upwardly inclined slots 57 are blocks or bearing pieces 59, which rest against the eccentrics and support at their upper ends a shaft 60, upon which is mounted a pressure roller 61 which bears against the feed roller 49, or the web interposed between said rollers, as hereinafter described. Upon the shaft 55 is secured an arm 62, from which is suspended a weight 63. It will be evident from an inspection of Figs. 5, 6, and 7$^a$, that this weight will, through the medium of the eccentrics and movable bearing blocks 59, constantly press the roller 61 firmly against the web $b$ on roller 49, and insure a positive feed of the web, without slippage, when the roller 49 is turned.

Figures 6, 6A:
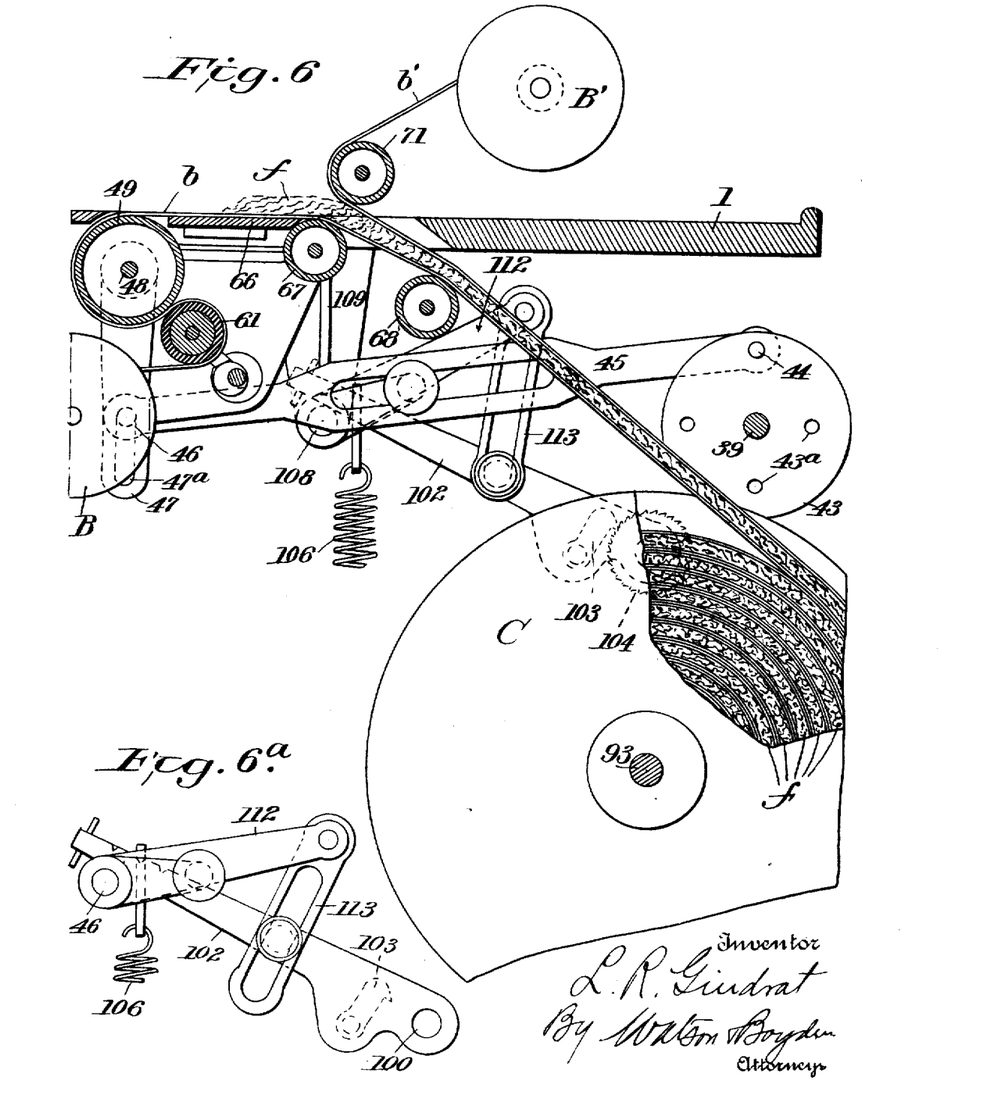
Fig. 6 is a view similar to Fig. 5 on a larger scale, showing the reel tensioning devices in their uppermost positions, and the reel charged with filler, one end of the reel being partly broken away.

The spool B, for holding the web $b$, which serves as a feed belt, is detachably mounted in bearings 65 and 65$^a$ in the plates 52, and this web is threaded from the spool B, around the pressure roller 61 and between said roller and the roller 49, thence passing horizontally rearward from the knife over a stationary plate 66 and an idle roller 67, mounted in the bearing plates 52, and thence downwardly over another idle roller 68, mounted in bearings 69, and thence to the winding or charging reel C, which is mounted as hereinafter described in the lower part of the machine. The spool B′, which carries the web $b'$, is mounted in bearings in a pair of brackets 70 and 70$^a$, secured to the top of the bed plate, and the web $b'$ passes over an idle roller 71, arranged above the bed plate of the machine, and thence extends downward over the roller 68, and is connected to the charging reel C. The two rollers 67 and 71 are spaced apart far enough to permit the filler $f$, which is laid upon the web $b$ over the plate 66, as shown in Fig. 6, to feed forward with said web between the rollers, and as the webs approach one another in passing the roller 68, the filler is gradually compressed between them, and carried, between the webs, on to the reel C. In order to adjust the width of the space or throat between the rollers 67 and 71, the latter roller has its shaft mounted in arms 72, which are hinged to the brackets 70 and 70ª, and the arms 72 are adjustable by means of screws 73 and 73ª, arranged at opposite sides of the pivotal points of the arms and bearing against the bed of the machine.

Figures 14, 15, 16:
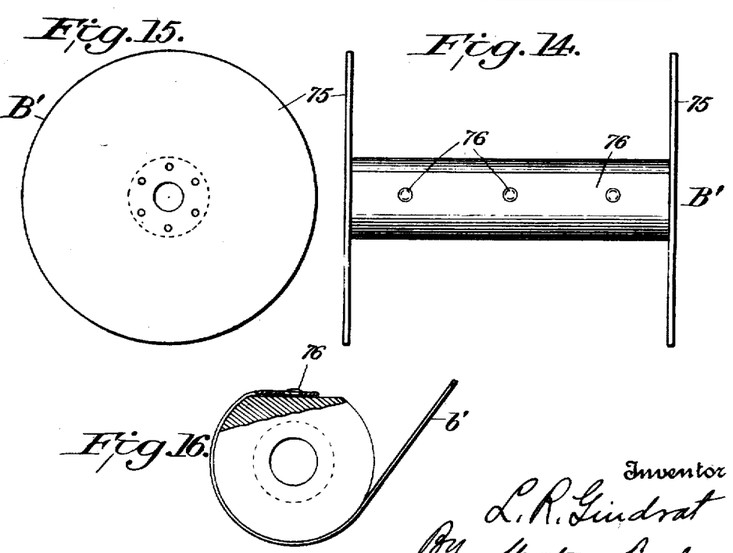
Fig. 14 and Fig. 15 are side and end views, respectively, of one of the spools.
Fig. 16 is an end view of the same with the heads removed and the body partly broken away, showing the web attaching means.

The spools B and B' are alike in construction, and the bearings for their spindles are similarly formed. Referring to Figs. 12 to 16, inclusive, which illustrate the construction of one of the spools, the body of the spool comprises a tubular core 74, having disks 75 at its ends, and the core is provided with suitable means for detachably connecting a web thereto. In Figs. 14 and 16, for this purpose, the core is shown with buttons 76 adapted to be engaged by eyelets in the end of a web. The core of the spool has a small bore 74ª at one end and a larger bore 74ᵇ, at the opposite end, and the spindle s is composed of the two parts 80 and 81, connected by a threaded joint 82. The part 81 has a head 81ª, at one end, fitting closely within the bore 74ᵇ, and between said head and the end of said bore is interposed a spring 83. The part 81 is also provided with a bearing portion 81ᵇ, adapted to fit into a cylindrical bearing 84 in the bracket 70ª. The part 80 of the spindle has a portion 80ª, fitting closely within the bore 74ª, and a bearing portion 80ᵇ, adapted to fit a bearing 85 in the bracket 70. This bearing 85 has a segment cut out at the top, leaving a slot 85ª, and the part 80 of the spindle has a reduced portion 80ᶜ, the diameter of which is less than the width of said slot. The two parts of the spindle are keyed to the core by set screws 86 and 87, in the core, which extend into slots 80ᵈ and 81ᵈ, respectively, in the parts 80ª and 81ª of the spindle. The spindle is also provided with a knob 88, by which it may be grasped. It will be evident, from the construction described, that by pulling to the left on the spindle, in Fig. 12, the bearing portions 80ᵇ and 81ᵇ of the spindle will be drawn out of their bearings and the reduced portion 80ᶜ will be brought into the bearing 85, and as this reduced portion can pass through the slot 85ª, the spindle may be readily removed from the brackets. In replacing the spool in its brackets, the spindle is pulled out until the part 80ᶜ is drawn out of the core and the bearing portion 81ᵇ is drawn into the core, and if the spool is then placed with its axis in line with the axes of the bearings and the spindle is released, the spring will force the spindle to the right and carry its bearing portions into the bearings, where the spindle will remain locked against accidental removal.

Figure 5:
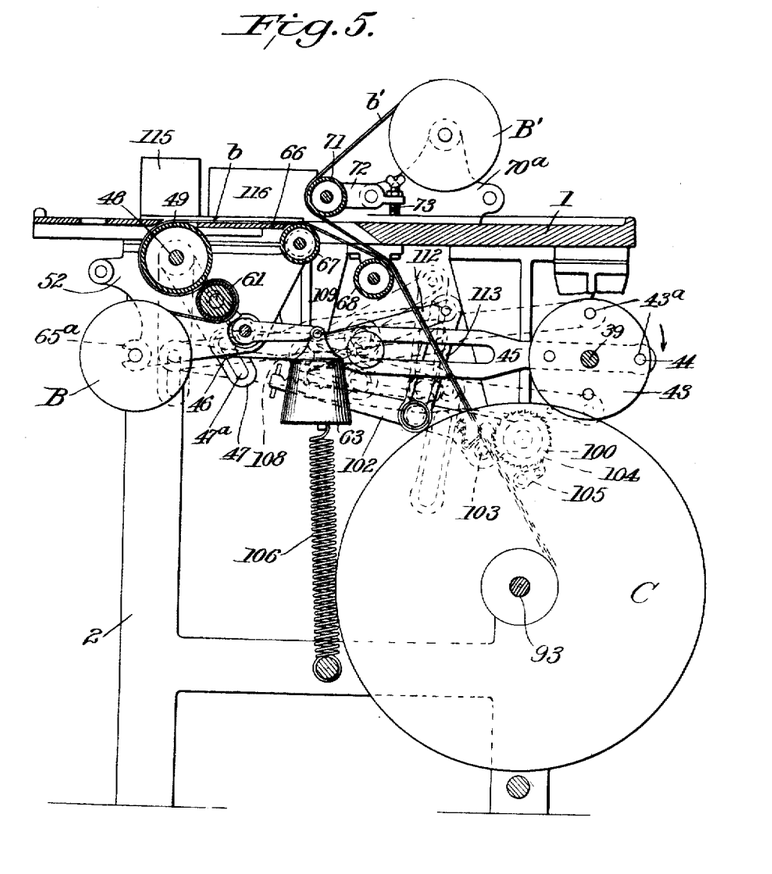
Fig. 5 is a vertical section on the line 5—5 of Fig. 3 some of the parts being omitted and the spools and charging reel being shown in end view.
Figure 7:
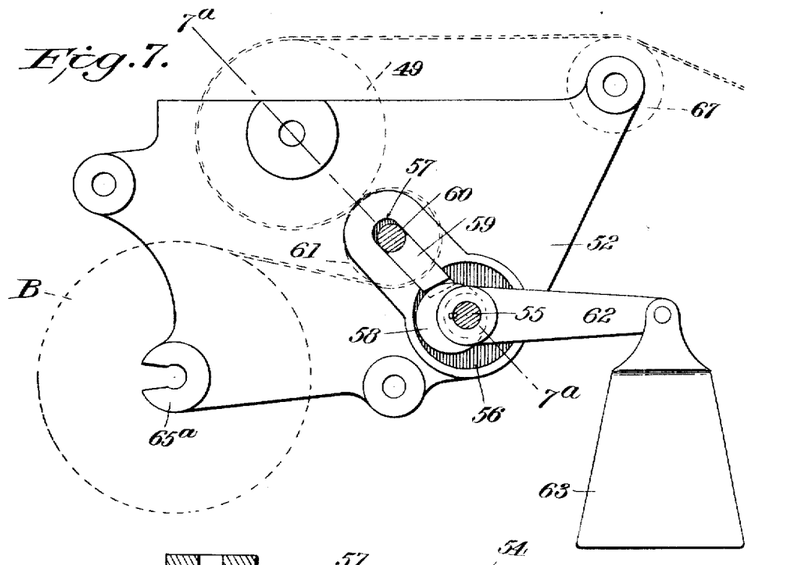
Fig. 7 is an enlarged side view of one of the brackets for supporting the feed rolls and one of the spools, the mechanism for pressing the rolls together being also shown.
Figure 7A:
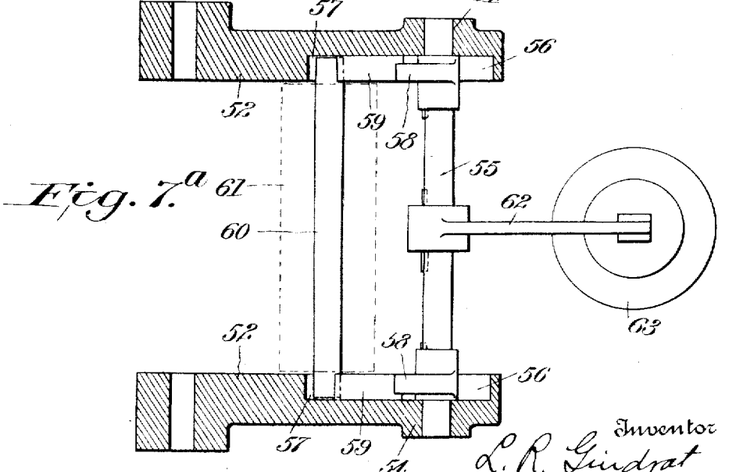

The bearings 65 and 65ª, in the plates 52, for receiving the spindle of the spool B, are the same as the bearings 84 and 85, the bearing 65ª being notched, as clearly shown in Figs. 5 and 7ª, like the bearing 85, and it will be understood that either spool may be placed in either set of bearings.

Figures 12, 13:
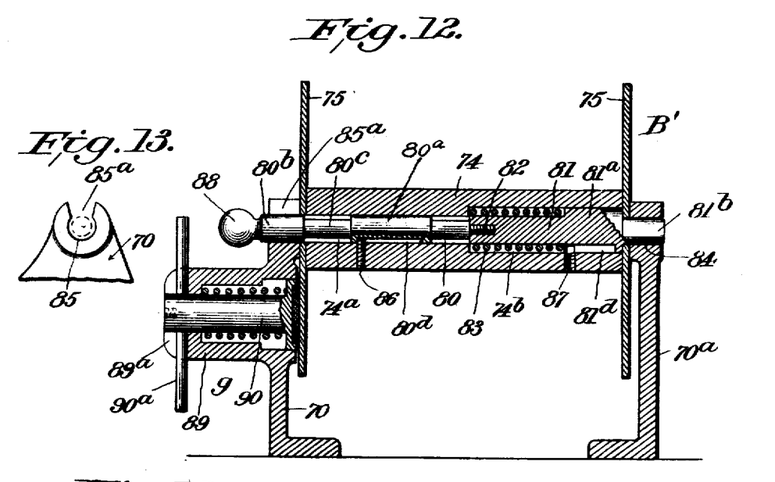
Fig. 12 is a section on the line 12—12 of Fig. 1.
Fig. 13 is an end view of the spindle bearing shown at the left in Fig. 12.

Each spool is prevented from turning freely by a friction brake arranged upon one of its supporting brackets. The brake $g$, for bearing against the upper spool is shown in detail in Fig. 12, and the brake for bearing against the lower spool is indicated at $g'$, in Fig. 3. These brakes are alike in construction and a description of the brake $g$ will suffice for both. As shown in Fig. 12, the bracket 70 is provided with a hollow boss 89, within which is arranged a spring pressed plunger 90, having a suitable wearing surface which bears frictionally against the adjacent spool disk. The end of the boss 89 has a slot 89ª, and the plunger has a handle 90ª, consisting of a straight rod which rests in the slot when the brake is in operative position. In removing or replacing the spool in its bearings, the plunger is moved outwardly against the action of its spring and the rod 90ª then turned at right angles to the slot, and the walls of the slot will then hold the brake in its retracted position, permitting the insertion or removal of the spool without interference by the brake.

Figure 8:
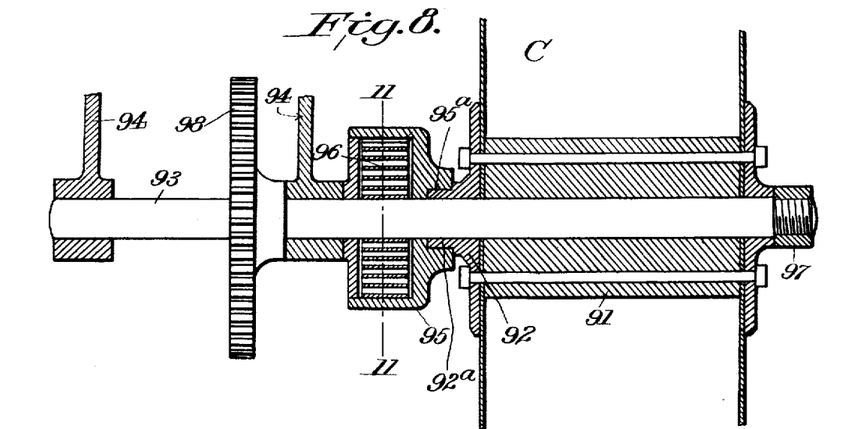
Fig. 8 is a section on the line 8—8 of Fig. 1.
Figure 9:
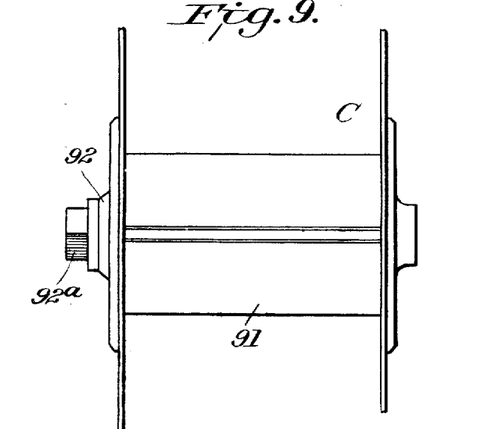
Fig. 9 is a side view of the charging reel and Fig. 10 is a transverse section through the same.
Figure 10:
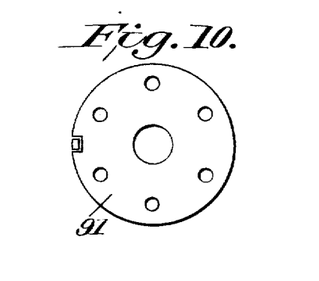
Figure 11:
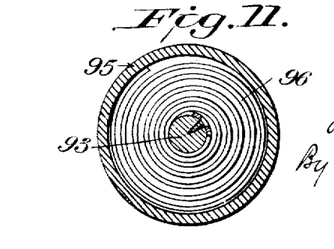
Fig. 11 is a section on the line 11—11 of Fig. 8.

The charging reel C, as shown in Figs. 8 and 9, has a tubular core or body 91, and the spool is provided at one end with a hub 92, having a squared or angular end 92ª. The reel is adapted to fit on a shaft 93, which is journaled in hangers 94, depending from the bed of the machine. Upon this shaft is journaled a spring barrel 95, having at one end an angular socket 95ª, adapted to receive the angular hub on the reel, as shown in Fig. 8. Within the spring barrel is arranged a spiral spring 96, one end of which is attached to the shaft 93, while the other end is secured to the cylindrical wall of the barrel, as shown in Fig. 11. The reel is held in position upon the shaft by a suitable retaining device, such as the nut 97, which allows the reel to turn upon the shaft. It will be seen that with this construction, when the reel is placed upon the shaft and in engagement with the spring barrel, the reel will be yieldingly connected to the shaft through the spiral spring. Upon the shaft is secured a gear 98, which meshes with a gear 99, the latter mounted upon a shaft 100, which is journaled in bearings 101, in the hangers 94. A ratchet lever 102 has one end journaled upon the shaft 100, and this lever carries a spring pressed pawl 103, which engages a ratchet wheel 104, secured to the shaft 100. A holding pawl 105, also engaging said ratchet wheel, is pivoted to the adjacent hanger 94. It will be evident that a downward movement of the ratchet lever 102 will cause the gears 99 and 98 to turn, and if the reel C is held stationary, tension will be applied to the spring in the spring barrel 95. A main spring 106 is provided for moving the ratchet lever downward, or in the direction to wind the spiral spring 96, and mechanical devices are provided for automatically putting the main spring under tension. As shown in the drawing, the main spring is connected at one end to the cross bar 4, and its opposite end is connected by an eye 107 to the free end of the ratchet lever, this eye being adapted to engage in one of a series of notches 107ª on the upper edge of the lever, in order to vary the leverage as desired.

In order to apply tension to the main spring, a rock shaft 108, mounted in a hanger 109, is provided with a short arm 110 having thereon a roller which engages a longitudinal slot 111, in the connecting rod 45, which operates the feed mechanism, and the shaft 108 is also provided with a longer arm 112, to which is pivotally attached a link 113, having a longitudinal slot into which a stud or roller on the ratchet lever 102 extends.

Figure 1:
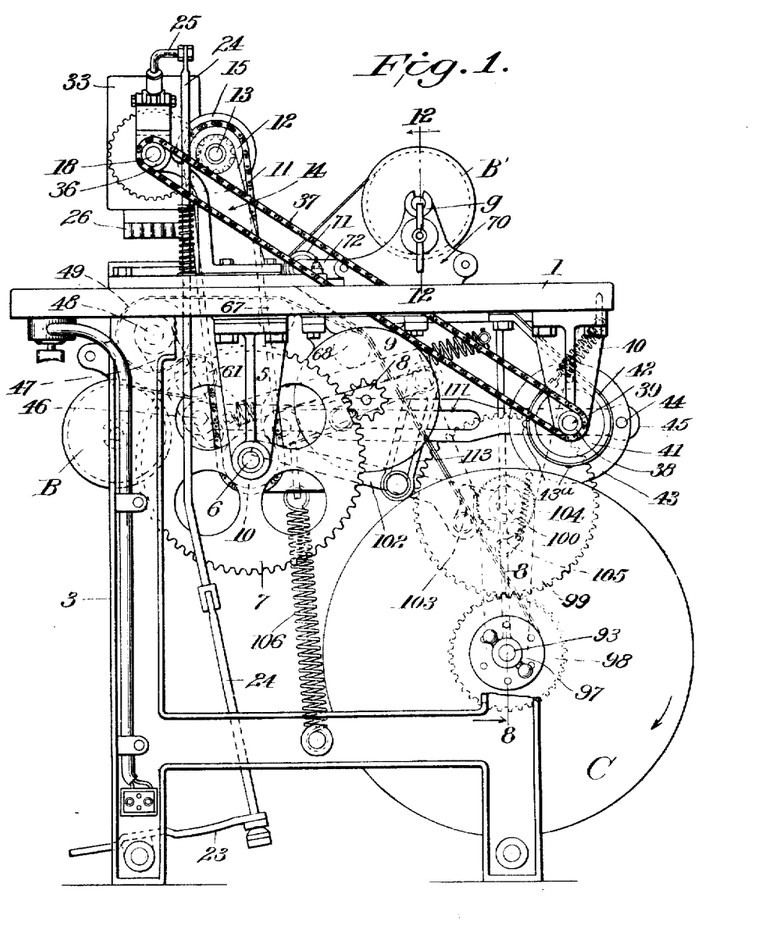
Figure 1 is a right side elevation of the machine.
Figure 2:
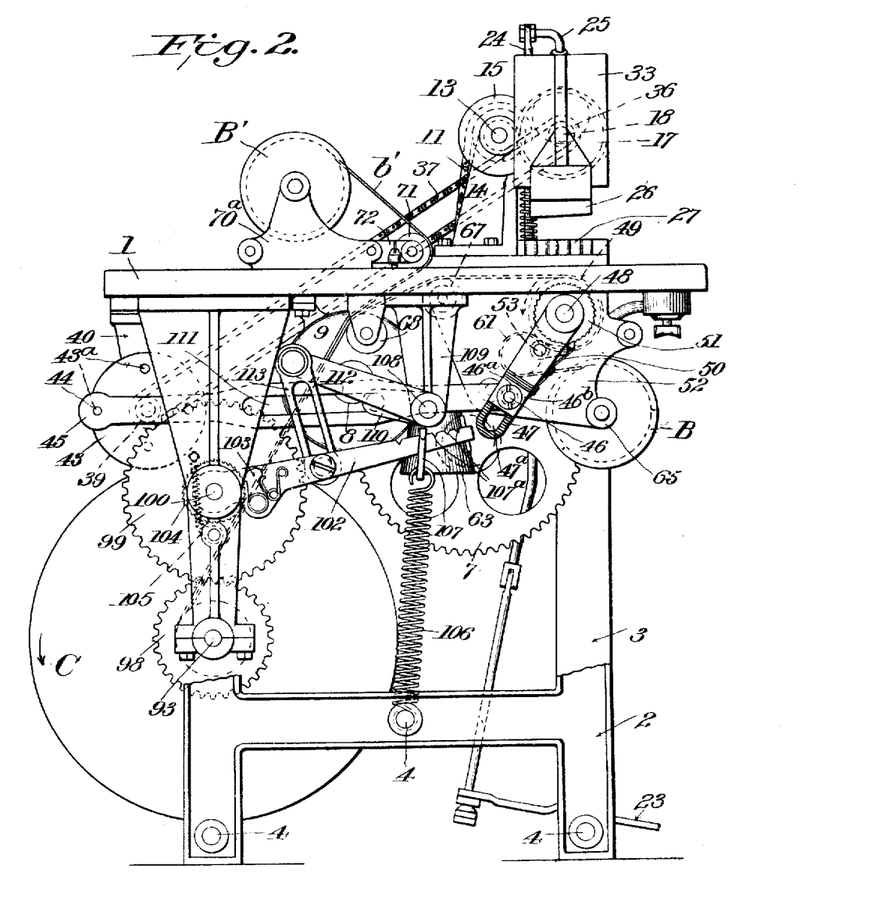
Fig. 2 is a left side elevation of the same.

Normally, the parts just described stand in the positions shown in full lines in Figs. 1, 2, and 5 of the drawing, the stud or roller on the ratchet lever 102 resting in the bottom of the slot in the link 113, the spring 106 being partly stretched. After the operator has placed the reel and the spools in the machine, and before starting to operate the machine, he gives the reel C several turns manually to apply an initial tension to the spiral spring in the barrel 95. Thereafter this tension is increased to the desired amount and maintained practically constant by the operation of the machine. Each time the clutch is tripped, the connecting rod 45 makes one complete movement and operates the feed roller 49, as before described, to feed the webs forward a short distance, and the reel C takes up the web as it is fed. As the connecting rod moves downward and then upward and then downward to its normal position, the arms 110 and 112 and the link 113 are similarly moved. When the link 113 moves downward, as indicated in dotted lines in Figs. 5 and 6ª, its support is taken away from the ratchet lever 102, which will then be pulled down by the main spring 106, unless the tension of the spring in the barrel 95, which acts in opposition to the spring 106, is as great as the tension of the latter spring. At the commencement of operations, this balanced tension will not usually exist, and therefore, as the link 113 moves down, the spring 106 will pull the ratchet lever 102 downward and this, though the gears 99 and 98, will cause a partial winding of the spring in the barrel 95. During the upward movement of the link 113, the lever 102 will be carried above the position shown in full lines in Fig. 5 of the drawing to the position shown in the upper dotted lines in Fig. 5, and in full lines in Fig. 6, and as the link returns to its normal position, the lever 102 will be pulled downward by the spring 106, causing an additional winding of the spiral spring. It will be evident that with repeated operations of the driving mechanism, the downward and upward movement of the ratchet lever will continue until the tension of the spiral spring 96 is great enough to support the ratchet lever 102, against the action of the spring 106, at about the highest point to which said lever can be mechanically raised by the link 113, which position is indicated by the upper dotted lines in Fig. 5, and in full lines in Figs. 6 and 6ª. In this position the springs are balanced with the proper tension applied to the reel C. As the feeding of the webs continues, of course, the spiral spring will partly unwind, but this loosening in the tension of the spring is immediately taken up by the operation of the ratchet lever which commences as soon as the spring 106 pulls said lever below its uppermost position. When the webs are entirely unwound from the spools B and B', their ends are released from said spools, the end portion of the web b being still held against movement by the pressure of the roller 61, and the reel is then turned by hand until the ends of the webs are wound on the reel, after which a strap is placed around the webs to hold them and prevent unwinding. The reel is then allowed to turn until the spiral spring is unwound when the full reel and the empty spools are removed and replaced by another reel and spools.

In the operation of the machine, the operator first places the spools, having the webs wound thereon, in their bearings and the charging reel is placed in position upon its shaft. The webs are then threaded around the feed rollers and guide rollers and their ends are attached to the core of the charging reel. The latter is then given several turns by hand in order to wind the spiral tensioning spring enough to cause the reel to take up the slack in the webs as the latter are fed forward. The operator, then takes a handful of the tobacco which is to be cut to form the filler and places it between the knives, as indicated by the dotted lines 28 in Fig. 3, grasping the leaves with both hands, one at each side of the cutter, and holding one end of the bundle of leaves against a stop 115, which is adjustable toward and from the cutter and determines the length of the filler. The pedal is then operated to trip the clutch and the clutch shaft makes one revolution, causing the knife to sever the bundle of tobacco, leaving the part which is cut off in the operator's left hand. While the knife is severing the tobacco, the feed mechanism is also operated and the webs are fed forward a short distance. The operator places the filler which has been cut off upon the horizontal portion of the web $b$, which is then stationary, between a pair of adjustable guide plates 116, and repeats the operation, laying the severed bundles of filler upon the belt in a continuous layer. The spiral spring which turns the charging reel is automatically kept under tension, in the manner before described, and as the feed rolls intermittently pay off the web from the spool B, at each operation of the cutter, the charging reel, constantly pulling on this web, takes it up as fast as it is paid off by the feeding mechanism, and also draws the web from the spool B'. The layer of filler deposited upon the belt $b$ is covered and held in position by the belt $b'$, and is wound upon the charging reel between the webs, being more or less compacted as it passes the roller 68 and also by the pressure of the successive coils of the webs upon the charging reel. When the webs have been entirely unwound from the spools, their ends are disconnected from the spools and the reel is turned by hand until the ends of the webs are wound upon the reel, when a strap is passed around the reel to prevent unwinding of the webs. The full reel and empty spools are then removed from the machine and the latter is supplied with full spools and an empty reel, and the operation is continued.

The full reel and empty spools are then placed upon a cigar bunching machine like that shown in my copending application Serial No. 52,623, and in this machine the webs are automatically wound on to the empty spools and the filler is delivered to the automatic bunching mechanism. If it is not desired to use the tobacco in the full reel immediately, the reel may be kept in a humidor until it is desired to attach it to the bunching machine.

What I claim is:

1. In a filler charging machine, the combination with a reel and a pair of webs connected to the same, of feed mechanism for one of the webs, means for intermittently operating the feed mechanism, and means for applying a constant winding force to the reel.

2. In a filler charging machine, the combination with a reel and a pair of webs connected to the same, of feed mechanism for one of the webs, a cutter, means for intermittently operating the feed mechanism and cutter, and means for applying a constant winding force to the reel.

3. In a filler charging machine, the combination with a reel and a pair of webs connected to the same, of feed mechanism for one of the webs, a reciprocating cutter, means for intermittently and simultaneously operating the feed mechanism and the cutter, and means for constantly applying a winding force to the reel.

4. In a filler charging machine, the combination with a reel and a pair of webs connected to the same, of feed mechanism for one of the webs, means for intermittently operating the feed mechanism, a spring for rotating the reel, and means operated by the machine for applying tension to said spring.

5. In a filler charging machine, the combination with a reel and a pair of webs connected to the same, of feed mechanism for one of the webs, means for intermittently operating the feed mechanism, a spring for rotating the reel, and means co-acting with the feed mechanism for applying tension to said spring.

6. In a filler charging machine, the combination with a reel and a pair of webs connected to the same, of feed mechanism for one of the webs, means for intermittently operating said mechanism, a winding spring for the reel, a main spring and means operated thereby for applying tension to the winding spring, and means for intermittently applying tension to the main spring.

7. In a filler charging machine, the combination with a reel and a pair of webs connected to the same, of feed mechanism for one of the webs, means for intermittently operating said mechanism, a winding spring for the reel, a main spring and means operated thereby for applying tension to the winding spring, and means co-acting with the feed mechanism for applying tension to the main spring.

8. In a filler charging machine, the combination with a reel and a pair of webs connected to the same, of feed mechanism for one of the webs, means for intermittently operating said mechanism, a winding spring for the reel, a main spring and ratchet mechanism operated thereby for applying tension to the winding spring, and means for restoring tension to the main spring.

9. In a filler charging machine, the combination with a reel and a pair of webs connected to the same, of feed mechanism for one of the webs, means for intermittently operating said mechanism, a winding spring for the reel, a main spring and means operated thereby for applying tension to the winding spring, and means for maintaining a definite balanced relation between said springs as the reel winds.

10. In a filler charging machine, the combination with a reel and a pair of webs connected to the same, of feed mechanism for one of the webs, means for intermittently operating said mechanism, a winding spring for the reel, a main spring and means operated thereby for applying tension to the winding spring, means for maintaining a definite balanced relation between said springs as the reel winds, and means, adjustable at will, for varying the tension between said springs.

11. In a filler charging machine, a charging reel and means for rotatably mounting the same, webs connected to said reel, means for feeding one of said webs, a rotatable device adapted to engage the reel, a driving member, a winding spring connecting said device with said member, and means for operating said member to wind said spring.

12. In a filler charging machine, a winding shaft, a charging reel detachably mounted on the shaft, a winding spring connected between said shaft and reel, webs connected to said reel, means for feeding one of said webs, and means for operating said shaft to wind said spring.

13. In a filler charging machine, a winding shaft, a charging reel detachably mounted on the shaft, a device journaled on said shaft and having means for engaging the reel, a winding spring connecting said device with the shaft, webs connected to said reel, means for feeding one of said webs, and means for operating said shaft to wind said spring.

14. In a filler charging machine, a winding shaft, a reel adapted to turn thereon, a device journaled on the shaft and adapted to interlock with the reel, a winding spring connecting said device with the shaft, webs connected to said reel, means for feeding one of said webs, and means for automatically turning said shaft when the tension on said spring relaxes to a predetermined extent.

15. In a filler charging machine, a winding shaft, a reel adapted to turn thereon, a device journaled on the shaft and adapted to interlock with the reel, a winding spring connecting said device with the shaft, webs connected to said reel, means for feeding one of said webs, and means for automatically turning said shaft when the tension on said spring relaxes to a predetermined extent comprising a ratchet wheel, a ratchet lever for engaging said wheel, a main spring for moving said lever in the direction to apply tension to the winding spring and means operated by the machine for moving said lever in the opposite direction.

16. In a filler charging machine, the combination with a filler cutter, a charging reel, a pair of web-holding spools and webs connecting said spools with the reel, of means operated by the machine for applying an elastic driving force to the reel, and means for feeding one of said webs a predetermined distance at each operation of the cutter.

17. In a filler charging machine, the combination with a filler cutter, a charging reel, a pair of web-holding spools and webs connecting said spools with the reel, of means for frictionally retarding the movements of the spools, means operated by the machine for applying an elastic driving force to the reel, and means for feeding one of said webs a predetermined distance at each operation of the cutter.

18. In a filler charging machine, the combination with driving means, a clutch shaft, a reciprocating cutter operable by said shaft, a clutch for connecting said shaft to the driving means and for disconnecting the same after each operation of the cutter, a charging reel, a pair of webs connected to said reel, means operated by said shaft for feeding one of said webs, and means, also operated by said shaft for applying constant driving force to the reel.

19. In a filler cutter and charging machine, the combination with a cutter, of a charging reel, a pair of webs connected to the reel, guiding means for holding a portion of one of said webs in horizontal position adjacent the cutter, and means for winding said webs on to the reel.

20. In a filler charging machine, a charging reel detachably connected to the machine, a pair of spools, webs adapted to connect said spools with the reel, guiding means for said webs adapted to lay one web over the other, and means for winding said webs on to the reel.

21. In a filler charging machine, a charging reel detachably connected to the machine, a pair of spools detachably connected to the machine, webs adapted to connect said spools with the reel, guiding means for said webs adapted to lay one web over the other, and means for winding said webs on to the reel.

22. In a filler charging machine, the combination with a charging reel and means for applying winding force to the same, of a pair of webs connected to said reel, a feed roller for one of said webs, a ratchet lever for operating the feed roller, a shaft, means for rotating the shaft and means for stopping the same at the completion of each revolution, and a connecting rod operated by said shaft and connected to said ratchet lever.

23. In a filler charging machine, the combination with a charging reel, a winding spring for turning the same, and ratchet mechanism and a main spring for applying tension to the winding spring, of webs connected to said reel, means for feeding said webs comprising an intermittently movable connecting rod and a crank for operating the same, and a device operable by said rod and having a sliding connection with the ratchet mechanism, for operating the latter.

24. In a filler charging machine, the combination with a charging reel, webs connected thereto and means for rotating the reel comprising a ratchet lever, of feeding means for the webs, a rocker movable with said feeding means, a link constituting a lost-motion connection between the rocker and ratchet lever, and a main spring connected to the ratchet lever.

25. In a filler charging machine, the combination with a charging reel, webs connected thereto and means for rotating the reel comprising a ratchet lever, of feeding means for the webs, a rocker movable with said feeding means, a link constituting a lost-motion connection between the rocker and ratchet lever, a main spring and means for connecting the same to the ratchet lever at different distances from its fulcrum.

In testimony whereof I have affixed my signature.

LOUIS R. GINDRAT.

Copies of this patent may be obtained for five cents each, by addressing the "Commissioner of Patents, Washington, D. C."